(12) United States Patent
Carrender

(10) Patent No.: US 7,598,867 B2
(45) Date of Patent: Oct. 6, 2009

(54) TECHNIQUES FOR FOLDED TAG ANTENNAS

(75) Inventor: Curtis L. Carrender, Morgan Hill, CA (US)

(73) Assignee: Alien Technology Corporation, Morgan Hill, CA (US)

( * ) Notice: Subject to any disclaimer, the term of this patent is extended or adjusted under 35 U.S.C. 154(b) by 221 days.

(21) Appl. No.: 11/512,607

(22) Filed: Aug. 29, 2006

(65) Prior Publication Data

US 2007/0046475 A1    Mar. 1, 2007

Related U.S. Application Data

(60) Provisional application No. 60/713,898, filed on Sep. 1, 2005.

(51) Int. Cl.
    *G08B 13/14*    (2006.01)
(52) U.S. Cl. .................................. 340/572.1; 340/572.7
(58) Field of Classification Search ............. 340/572.1, 340/572.7, 572.8; 343/803, 804
    See application file for complete search history.

(56) References Cited

U.S. PATENT DOCUMENTS

| 6,254,953 | B1 | 7/2001 | Elston |
| 6,407,669 | B1 | 6/2002 | Brown et al. |
| 6,724,311 | B1 | 4/2004 | Kolton et al. |
| 7,084,740 | B2 * | 8/2006 | Bridgelall ................ 340/572.1 |
| 7,256,739 | B2 * | 8/2007 | Usami .................... 340/572.7 |
| 7,353,598 | B2 * | 4/2008 | Craig et al. .................... 29/846 |
| 2003/0013503 | A1 | 1/2003 | Menard et al. |
| 2003/0080917 | A1 | 5/2003 | Adams et al. |
| 2005/0130389 | A1 * | 6/2005 | Yamazaki et al. ......... 340/572.8 |
| 2005/0168339 | A1 * | 8/2005 | Arai et al. ................ 340/572.8 |
| 2007/0029385 | A1 * | 2/2007 | Kovac et al. ............. 340/572.7 |
| 2007/0240304 | A1 * | 10/2007 | Eisenhardt et al. ....... 340/572.8 |

FOREIGN PATENT DOCUMENTS

| EP | 0 858 061 A | 1/1998 |
| EP | 1 632 926 A1 | 9/2004 |
| WO | WO 01/94126 A | 12/2001 |

* cited by examiner

*Primary Examiner*—John A Tweel, Jr.
(74) *Attorney, Agent, or Firm*—Blakely, Sokoloff, Taylor & Zafman LLP

(57) ABSTRACT

Techniques for an RFID device with improved multi-axis performance are provided. The device includes a flexible substrate with an antenna pattern formed thereon. A fold in the flexible substrate results in the antenna pattern crossing over itself and disposes a distal region of the antenna pattern away from a proximal region at about a predetermined angle. An integrated circuit is electrically coupled to the antenna pattern. In a specific embodiment, the antenna pattern is slit along a major axis to allow folding a segment of an antenna pattern.

16 Claims, 13 Drawing Sheets

TECHNIQUES FOR FOLDED TAG ANTENNAS

FIELD OF THE TECHNOLOGY

This application claims the benefit of prior U.S. provisional patent application No. 60/713,898, filed Sep. 1, 2005. The present invention generally relates to the field of radio frequency identification (RFID) devices, and particularly to RFID devices having folded antennas and methods for making same.

BACKGROUND

Goods and other items may be tracked and identified using an RFID system. An RFID system includes a tag and a reader. The tag is a small transponder typically placed on an item to be tracked. The reader, sometimes referred to as an interrogator, includes a transceiver and an antenna. The antenna emits electromagnetic (EM) waves generated by the transceiver, which, when received by tag, activates the tag. Once the tag activates, it communicates using radio waves back to reader, thereby identifying the item to which it is attached.

There are three basic types of RFID tags. A beam-powered tag is a passive device which receives energy required for operation from EM waves generated by the reader. The beam powered tag rectifies an EM field and creates a change in reflectivity of the field which is reflected to and read by the reader. This is commonly referred to as continuous wave backscattering. A battery-powered semi-passive tag also receives and reflects EM waves from the reader; however a battery powers the tag independent of receiving power from the reader. An active tag actively transmits EM waves which are then received by the reader.

Many applications of RFID systems demand inexpensive tags. High volume manufacturing methods are employed to reduce the cost of conventional tags. These manufacturing methods often provide further economy by using densely packed webs in roll-to-roll processes. Densely packed webs reduce the quantity of web material consumed, and thus the cost of the end product.

In some instances, high density webs are directly at odds with tag performance. An antenna web is a clear example of the tradeoff between cost and performance. In general, an antenna with more area is more easily adapted to multi-axis capabilities than one that has a relatively small area. That is to say, conventional techniques have yielded either a less expensive antenna or a larger antenna with superior omni-directional performance. This tradeoff is often made difficult because omni-directional performance happens to be critical in many RFID applications where relative orientation of a tag to a reader is unpredictable.

From the above it is seen that techniques for inexpensive tags with improved multi-axis performance are desired.

SUMMARY OF THE DESCRIPTION

Techniques for an RFID device with improved multi-axis performance are provided. The device, in one embodiment, includes a flexible substrate with an antenna pattern thereon. The antenna pattern can be elongated with a major axis of the pattern being significantly longer than a minor axis. A fold in the flexible substrate orients a portion of the antenna pattern, or flap, in a direction different from, or even orthogonal to, another portion of the antenna pattern. As a consequence, the fold alters the two dimensional layout of the elongated antenna pattern to improve multi-axis performance, while using less web material than a conventional antenna with rectangular substrate.

In one embodiment of the present invention, an RFID device includes a flexible substrate and an antenna pattern formed on the flexible substrate. The antenna pattern has a distal region and a proximal region. A fold in the flexible substrate crosses the antenna pattern over itself, and disposes the distal region away from the proximal region at about a predetermined angle. An integrated circuit is electrically coupled to the antenna pattern.

In another embodiment of the present invention, an RFID tag can be manufactured in the following manner. A substantially planar substrate is provided and a first antenna pattern formed thereon. The first antenna pattern, electrically coupled to an integrated circuit, extends in a first direction. At least one (e.g., 1, 2, 3, or more) fold position is determined in the flexible substrate. The flexible substrate is folded by an automated process at about the at least one fold position. The folding disposes a distal end of the first antenna pattern in a second direction relative to the fold position.

In yet another embodiment of the present invention, an RFID label comprises a facestock layer, an adhesive layer; and an RFID inlay. The RFID inlay includes a flexible substrate and an antenna pattern formed on the flexible substrate. The antenna pattern has a distal region and a proximal region. A fold in the flexible substrate allows the antenna pattern to cross over itself. The fold disposes the distal region away from the proximal region at about a predetermined angle. The RFID inlay also includes an integrated circuit electrically coupled to the antenna pattern. Roll-to-roll processes can be used to manufacture the inlay and label.

Various additional objects, features, and advantages of the present invention can be more fully appreciated with reference to the detailed description and accompanying drawings that follow.

BRIEF DESCRIPTION OF THE DRAWINGS

The present invention is illustrated by way of example and not limitation in the figures of the accompanying drawings in which like references indicate similar elements.

FIG. 11A includes a bottom view and a cross sectional view of this singulated RFID inlay.

DETAILED DESCRIPTION

The following description and drawings are illustrative of the invention and are not to be construed as limiting the invention. Numerous specific details are described to provide a thorough understanding of the present invention. However, in certain instances, well known or conventional details are not described in order to avoid obscuring the description of the present invention. References to one or an embodiment in the present disclosure are not necessarily references to the same embodiment; and, such references mean at least one.

Inlays, also referred to as inlets, include at least an integrated circuit (IC) and antenna on a substrate. Inlays can be made into tags (inlays with a protective over laminate) or converted into finished smart (RFID) labels. FIGS. 1A-1E illustrate an RFID inlay 100 according to an embodiment of the present invention. Top, bottom, and cross-sectional views of inlay 100 are respectively shown in FIGS. 1A-1C. Inlay 100 includes a substrate 102, antenna 104, and IC chip 106.

Substrate 102 can be flexible or rigid, and monolayer or multilayer. It can be made from polymeric, plastic, fabric, metal, or other suitable materials. Example of suitable materials that can be used for the substrate 102 include, but are not limited to, polyethylene, paper, polystyrene, polypropylene, polynorbornene, polycarbonate, polysulfone, polyethersulfone, polyetherimide, polyamide, polyetherimide, polyester polyarylate, polyethyleneterephthalate, and polyethylenenaphthalate, and derivatives thereof. Substrate 102 can be selected to allow unproblematic folding or bending in an automated manufacturing process. In a specific embodiment, the substrate is a flexible web substrate having a plurality of inlays disposed thereon.

Figure 1A:
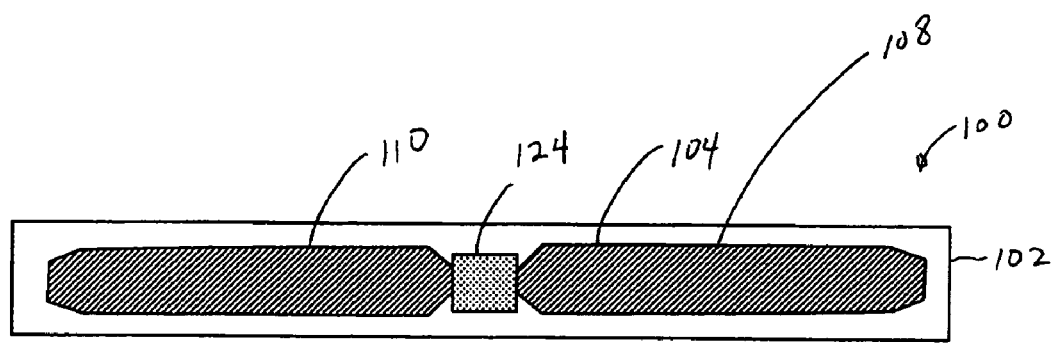
FIGS. 1A-1E illustrate an RFID inlay according to an embodiment of the present invention.
Figure 1B:
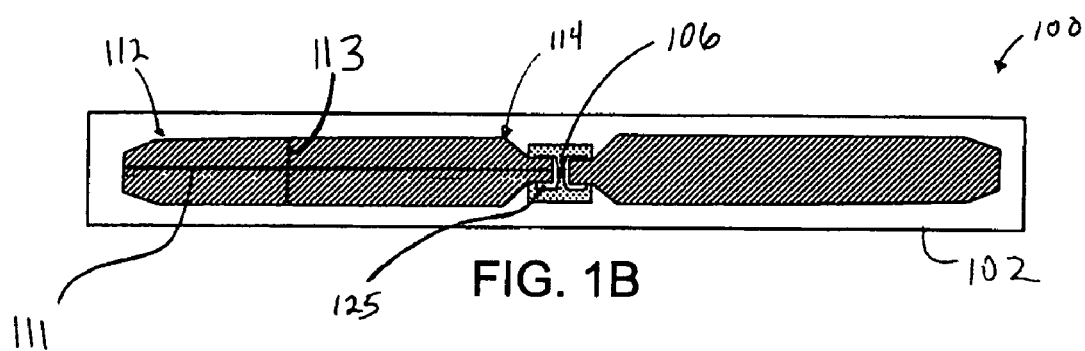
Figure 1C:
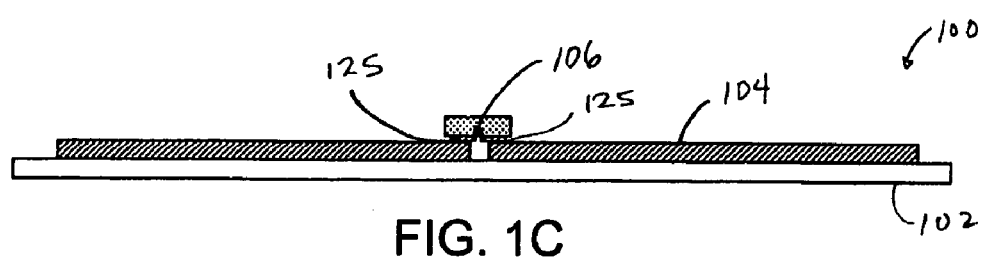

For typical applications of the present invention, IC chip 106 is a beam power (e.g., passive) device because of its inexpensive cost relative to battery powered and active devices. A NanoBlock™ IC made by Alien Technology Corporation is an example of an IC chip used for a passive tag. In FIG. 1C, IC chip 106 is affixed to substrate 124 and electrically coupled to antenna 104 via two or more contact pads 125 (e.g., 2, 3, 4, . . . N–1, N contact pads). IC chip 106 can even be embedded in substrate 124 using fluidic self assembly (FSA). Together substrate 124, IC 106, and contact pads 125 are sometimes referred to as a strap assembly. Additional details relating to strap assemblies and the manufacture thereof can be found in U.S. Pat. No. 6,606,247 and U.S. Patent Publication No. 2004/0183182, which are hereby incorporated by reference for all purposes. In alternative embodiments, the IC chip 106 can be directly attached to antenna 104 by known pick and place methods.

Antenna 104 is configured to receive radio signals from one or more readers broadcasting within a predefined frequency band. This frequency band is generally regulated by government bodies. For example, in the United States, the Federal Communications Commission permits use of frequency band 902 MHz to 928 MHz, as well as frequency band 2400 MHz to 2483.5 MHz, for RFID systems. In Europe, RFID devices operate in a frequency band of 865.6 MHz to 867.6 MHz. The frequency band directly influences antenna designs, particularly antenna patterns, however in general any UHF or higher frequency can be used.

In this exemplary embodiment, dipole antenna 104 is formed by antenna patterns 108 and 110, which are electrically isolated from each other. Antenna patterns 108 and 110 can be printed, sputtered, deposited, transfer laminated, or etched onto substrate 102. In one embodiment, gravure printing can be used for its high speed and low cost. Antenna patterns 108 and 110 are preferably metal (e.g., silver, copper, and the like), but can be any suitably conductive material.

Each of antenna patterns 108 and 110 has a major axis defined by distal and proximal regions. For example, antenna pattern 110 has a distal region 112 and a proximal region 114 along major axis 111. The length of major axis 111 ranges from about 1 inch to about 3 inches. This length need not be the same as a corresponding length for antenna pattern 108 in asymmetrical antenna designs. Alternatively, the length can range from about 1% to about 100% of a wavelength of the received radio frequency signals.

Figure 1D:
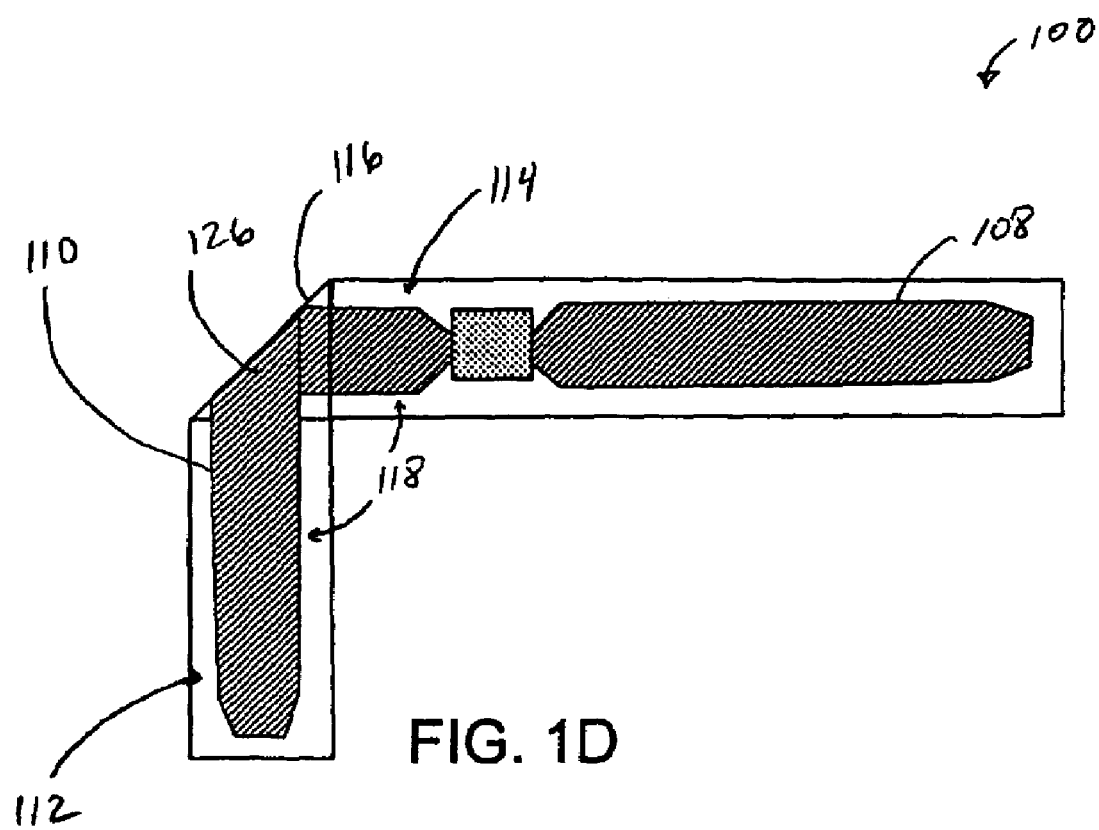

As illustrated in FIG. 1D, inlay 100 includes a fold 116 in the flexible substrate whereby antenna pattern 110 crosses over itself (e.g., an area of overlap 126). The fold disposes distal region 112 (also referred to herein as a flap) away from the proximal region 114 at about a predetermined angle 118. Predetermined angle 118 can range from about 10 degrees to about 170 degrees, preferably about 45 degrees to about 135 degrees, or even more preferably about 90 degrees. Fold 116 can be located at any point along antenna pattern 110, but in one embodiment fold 116 is disposed at about a midpoint of antenna pattern 110.

Figure 1E:
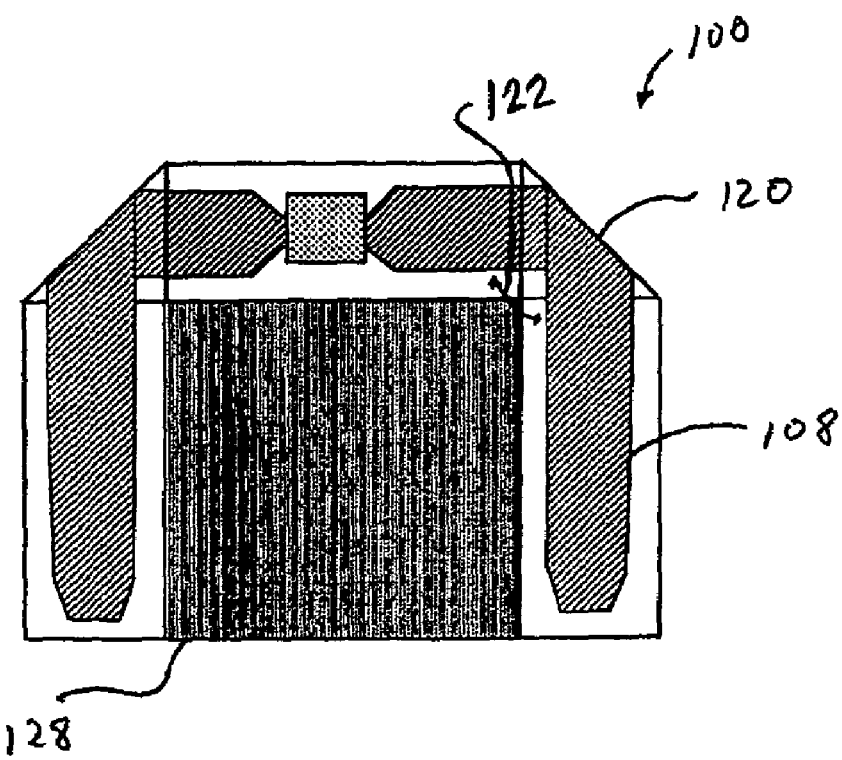

In a specific embodiment shown in FIG. 1E, antenna pattern 108 can also include, but not necessarily, a second fold 120. Fold 120 disposes a distal region away from a proximal region of antenna pattern 108 at about a predetermined angle 122. Predetermined angle 122 can range from about 10 degrees to about 170 degrees, preferably about 45 degrees to about 135 degrees, or even more preferably about 90 degrees. In this embodiment of the present invention, predetermined angle 122 equals predetermined angle 118, but in other embodiments predetermined angle 122 can be relatively larger or smaller than predetermined angle 118.

It should be noted that fold 120 can be located at any point along antenna pattern 108, but in one embodiment fold 120 is disposed at about a midpoint of antenna pattern 108. The location of fold 120 on antenna pattern 108 need not correspond to the location of fold 116 on antenna pattern 110. For example, fold 120 can be positioned closer to a proximal region of its associated antenna pattern, while fold 116 can be positioned closer to a distal region of its associated antenna pattern.

The irregular shape of inlay 100 after folds 116 and 120 results in less used web material. Additional web material 128 would be required for a similar, rectangular inlay of conventional design. Over an entire web of many inlays (e.g., 100, 500, 1000, or more inlays) a substantial savings can be realized.

Figure 2A:
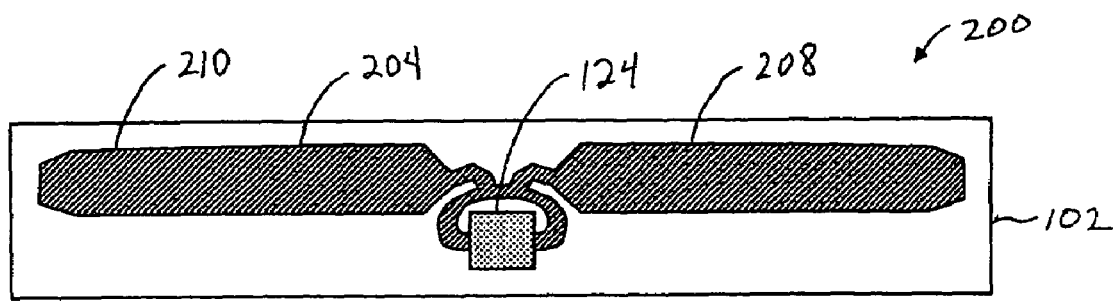
FIGS. 2A-2D illustrate an inlay according to an embodiment of the present invention.
Figure 2B:
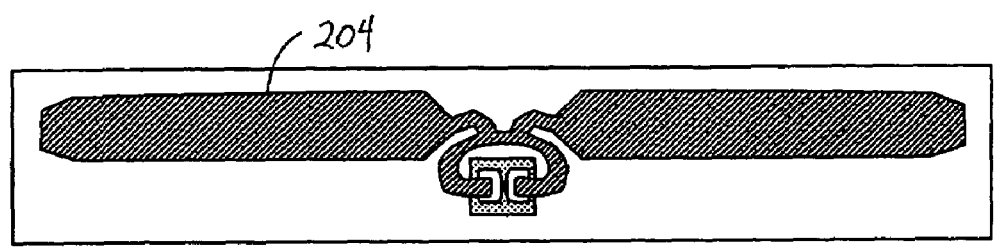
Figure 2C:
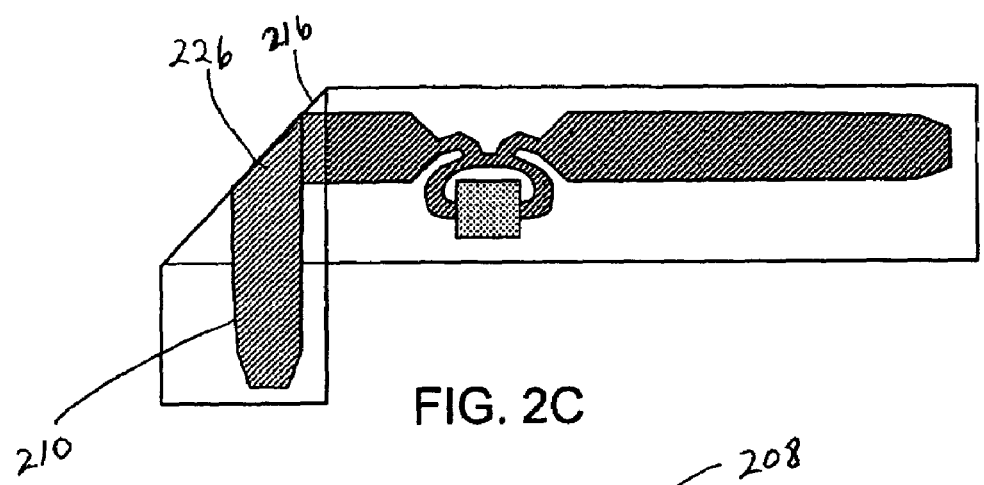
Figure 2D:
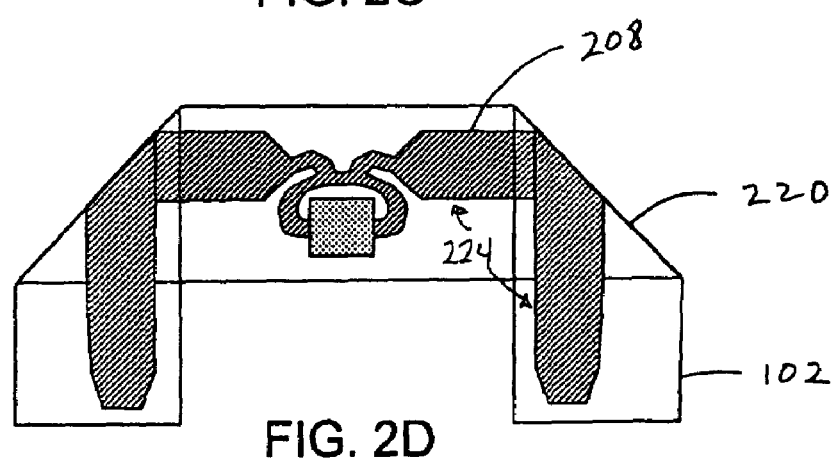

FIGS. 2A and 2B illustrate top and bottom views of an inlay 200. Inlay 200 includes a folded dipole antenna 204, where antenna patterns 208 and 210 of antenna 204 are electrically coupled. Referring to FIG. 2C, inlay 200 can include a fold 216, whereby antenna pattern 210 has an area of overlap 226. That is to say, antenna pattern 210 crosses over itself. In a specific embodiment, inlay 200 includes a second fold 220 in flexible substrate 102. Fold 220 produces a predetermined angle 224 between two regions of antenna pattern 208. Lengths of antenna patterns 208 and 210 along the major axis can each range from about 1 inch to about 3 inches. Alternatively, the lengths can range from about 1% to about 100% of a wavelength of the received radio frequency signals.

In light of the disclosures contained herein, one can apply the present invention to RFID tags, labels, or inlays with differing types of antennas, including monopole antennas, dipole antennas, folded dipole antennas, loop antennas, circularly polarized (CP) antennas, double dipole antennas, and the like. Elongated antenna patterns are particularly suited for the present invention to improve multi-axis performance. Inlays 100 and 200 illustrate exemplary embodiments of the present invention for a dipole antenna and a folded dipole antenna. Although the antenna patterns shown in inlays 100 and 200 are fashioned as solid planes, antenna patterns can be or include traces having any arbitrary pattern, such as curves, waveforms (e.g., saw-tooth, square-wave, sinusoidal, and the like), and freeform lines. In addition, in embodiments where it is undesirable for one trace of an antenna pattern to short another trace due to the folding, an insulating layer can be used to electrically isolate traces.

Figure 2E:
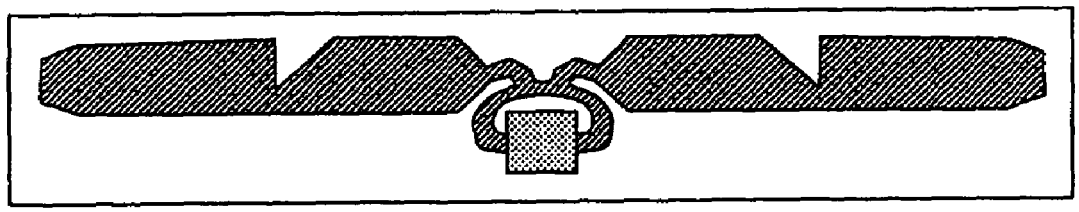
FIGS. 2E and 2F illustrate an inlay according to another embodiment of the present invention.
Figure 2F:
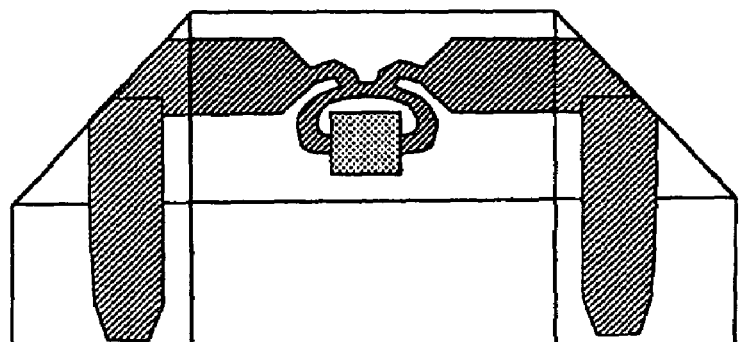

Antenna patterns can be designed for optimized RF performance in the folded arrangement. To be more precise, antenna patterns may be configured to have improved RF multi-axis performance in a folded arrangement relative to an unfolded arrangement. Similarly, antenna patterns can be designed take advantage of the folded arrangement for further savings. For example, FIGS. 2E and 2F illustrate an alternate embodiment that reduces the metallization of the antenna pattern, and therefore the cost. This cost can be considerable when manufacturing vast numbers of inlays, tags, or labels, sometimes on the order of millions to hundreds of millions of RFID devices.

Figure 3:
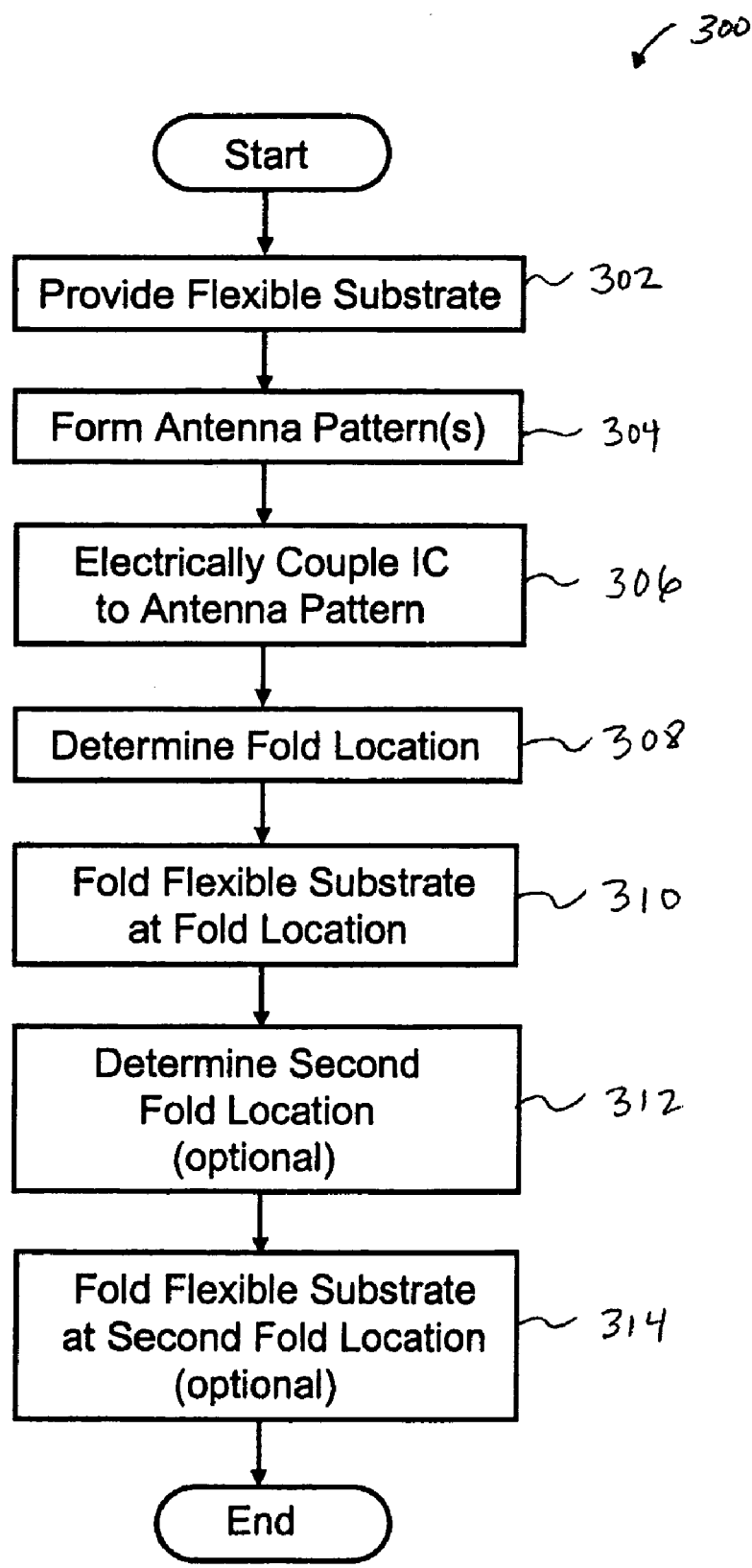
FIG. 3 illustrates a simplified flowchart representation of a method for manufacturing an inlay according to an embodiment of the present invention.

FIG. 3 is a simplified flowchart representation of a method 300 for manufacturing an inlay according to an embodiment of the present invention. In step 302, a flexible substrate is provided. This substrate may have the physical structure and properties as discussed above for substrate 102. In step 304, an antenna pattern is next printed, deposited, or etched onto the substrate. In an alternative embodiment, the substrate can have an antenna pattern preprinted. In fact, the substrate can be a web with a plurality of antennas spaced and preprinted thereon.

In step 306, an integrated circuit is electrically coupled to at least one antenna pattern. The integrated circuit is coupled to the at least one antenna pattern via one or more contacts of a strap assembly. Alternatively, the integrated circuit can be directly connected to the antenna pattern using a pick-and-place method.

Next, in step 308, a fold location (or bend point) in the flexible substrate is determined. This location can be anywhere along an antenna pattern, but generally about a midpoint of the pattern. In step 310, a flap of the flexible substrate is folded at the fold location. Folding can be accomplished by known techniques, including use of a folder. A folder is a machine configured to fold a flat substrate (such as paper or plastic) into a folded product. In steps 312 and 314, a second fold location is determined and a second flap of the flexible substrate is folded.

The method 300 for manufacturing an RFID device with a folded antenna pattern is an example. Many modifications to method 300 are possible without deviating from the scope of the invention. For example, steps 312 and 314 can be omitted altogether. Moreover, electrically coupling the IC to an antenna pattern can occur after folding the first and second flaps. Actually, folding can be completed after an inlay is converted into a tag or smart label in other embodiments.

Figure 4A:
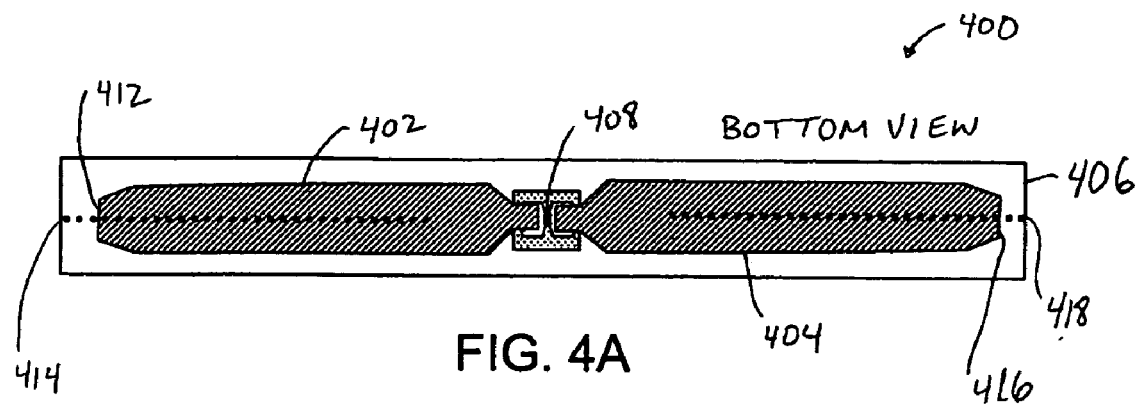
FIGS. 4A-4C show an inlay according to an embodiment of the present invention.
Figure 4B:
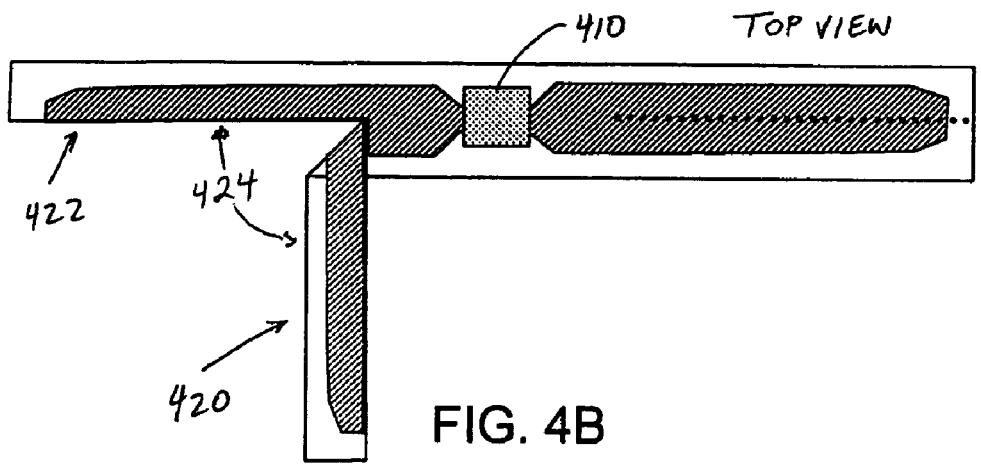
Figure 4C:
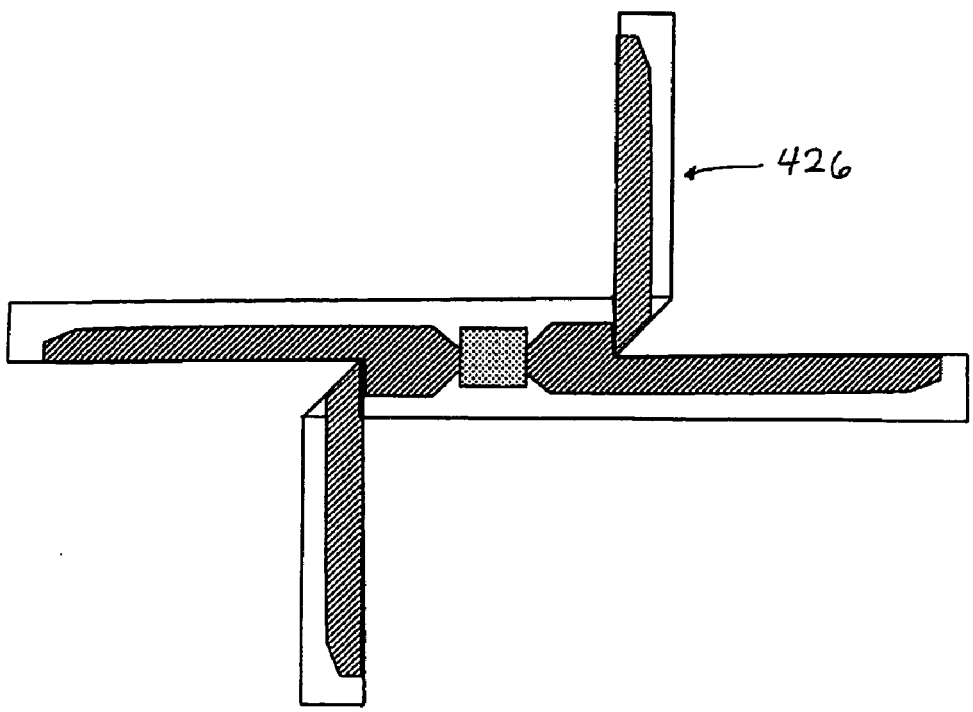

FIGS. 4A-4C show an inlay 400 according to an embodiment of the present invention. Inlay 400 includes antenna patterns 402 and 404 on a substrate 406. Antenna patterns 402 and 404 are respectively coupled to contact pads of an RFID IC 408 via contacts of a strap assembly 410. Flexible substrate 406 is slit along a major axis of antenna pattern 402 at end 412 by a slit 414.

Slit 414 divides antenna pattern 402 into two, partially detached portions 420 and 422. As a consequence, portion 420 can be folded to be at a different orientation than portion 422 for improved multi-axis performance. When folded, portion 420 is disposed away from portion 422 by a predetermined angle 424, which can range from about 10 degrees to about 170 degrees, preferably about 45 degrees to about 135 degrees, or more preferably about 90 degrees. In a specific embodiment, antenna pattern 404 can also include a slit 418 at end 416. Slit 418 allows portion 426 to be folded as well. It should be understood that instead of slitting a substrate and an antenna, the antenna could be made with a gap (appearing "pre-slit") to conserve the conductive medium.

Figure 5:
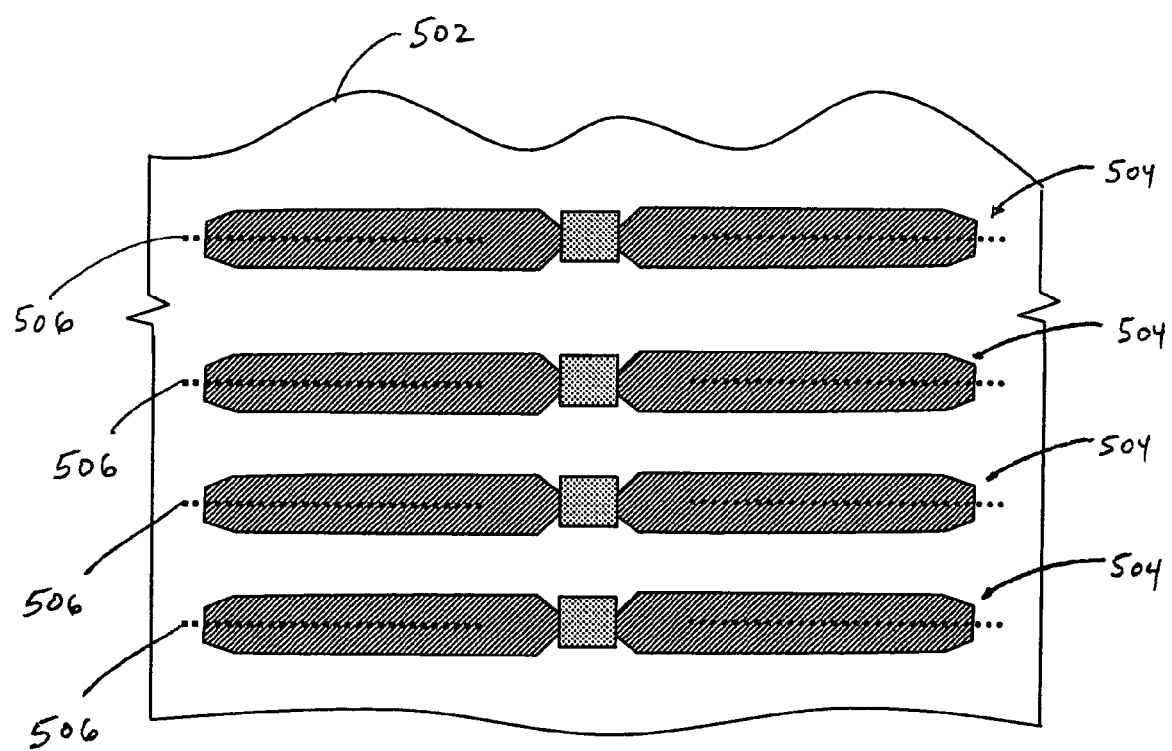
FIG. 5 illustrates a back view of RFID inlays on a substrate according to an embodiment of the present invention.

FIG. 5 illustrates a top view of RFID inlays 504 on a substrate 502 according to an embodiment of the present invention. Substrate 502 is at least one of a web, reel, and tape for superior manufacturability and reduced cost. It can include sprocket holes and/or alignment marks (not shown), as well as other features related to roll-to-roll or reel-to-reel processing. In specific embodiments, substrate 502 includes a plurality of columns (i.e., two, three, four, or more columns) and/or a plurality of rows (i.e., two, three, four, or more rows). During subsequent processing, each inlay 504 can be singulated from substrate 502 and folded along a slit 506.

Figure 6:
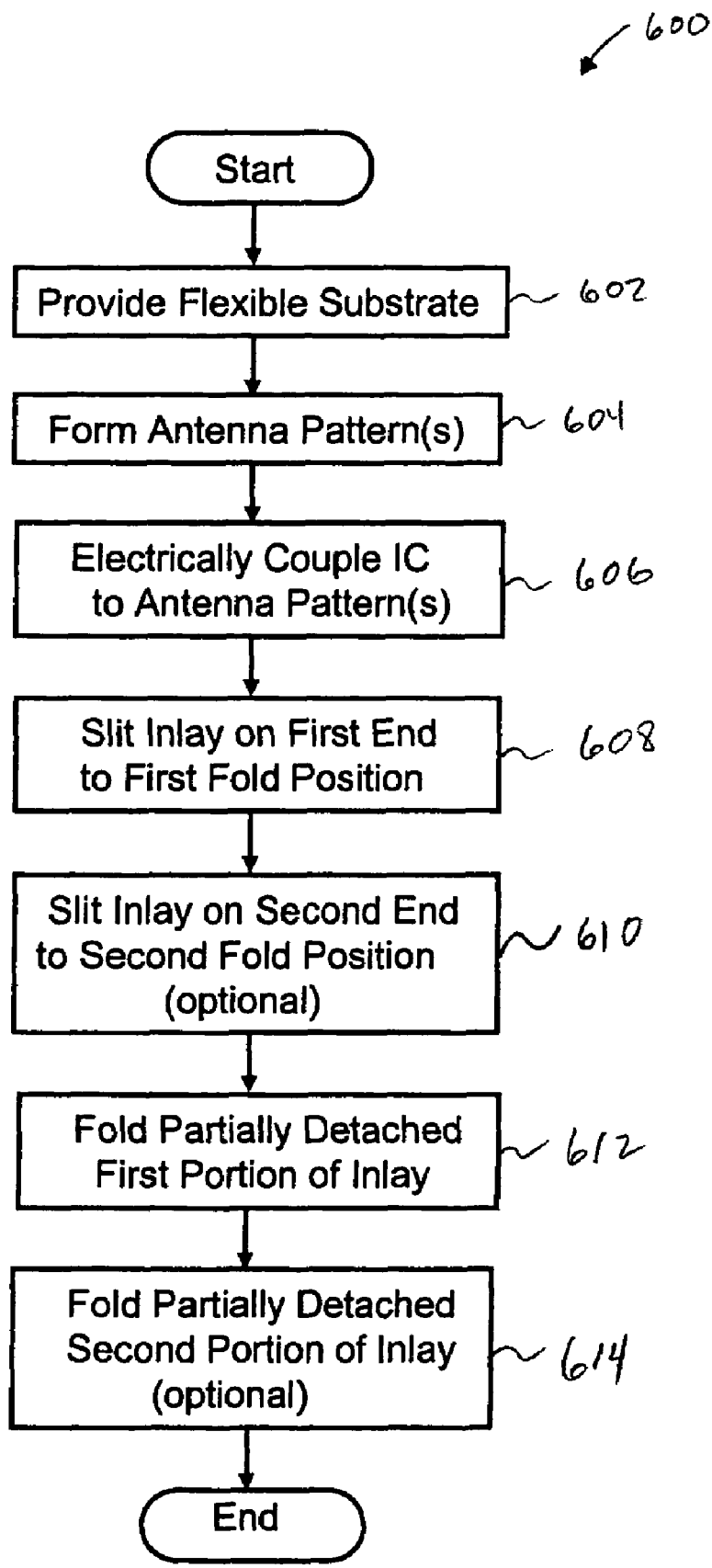
FIG. 6 illustrates a simplified flowchart representation of a method for manufacturing inlays according to an embodiment of the present invention.

FIG. 6 illustrates a simple flowchart representation of a method 600 for manufacturing inlays according to an embodiment of the present invention. A flexible substrate is provided in step 602, and antenna pattern(s) are formed thereon in step 604. As discussed above, the antenna pattern(s) can form monopole, dipole, loop, folded dipole, CP, and double dipole antennas, as well as others. An IC is electrically coupled to the antenna pattern(s) in step 606 to form an inlay. At that time and anytime thereafter, the inlay can be tested for operability by RF communication, if desired.

As indicated in step 608, the inlay is slit from a first end of an antenna to a predetermined fold position. The slit may run along a major axis of the antenna pattern or, alternatively, at an angle to the major axis (e.g., skewed with respect to the major axis). Optionally, in step 610, a second slit may run from a second end of an antenna to a second predetermined fold position. One or more partially detached portions of the inlay can be folded in steps 612 and 614. Steps 612 and 614 may be performed after the inlay has been singulated from the flexible substrate. Each of the above steps in method 600 can be performed in an automated, continuous manufacturing process.

The method 600 discussed above for manufacturing an RFID device with a folded antenna pattern is an example. Many modifications to method 600 are possible without deviating from the scope of the invention. For example, electrically coupling the IC to an antenna pattern can occur after slitting and/or folding. Moreover, steps 602 and 604 can be combined by providing a substrate that includes preprinted antenna patterns.

Figure 7A:
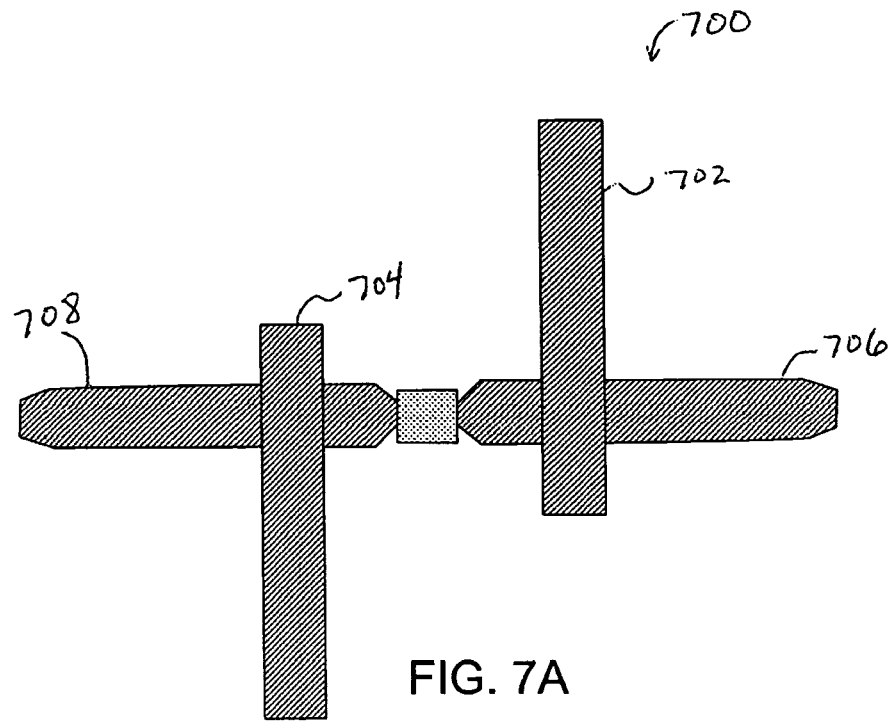
FIG. 7A shows an inlay according to an embodiment of the present invention.

FIG. 7A shows a tag 700 according to alternative embodiment of the present invention with improved multi-axis performance. Tag 700 includes an inlay, which can be manufactured with high web density. Antenna segments 702 and 704 (alternatively, conductive traces) are crossed over and electrically coupled, directly or capacitively, to the inlay's antenna patterns 706 and 708, respectively. For example, segments 702 and 704 can be printed on a separate web and coupled to the inlay. Alternatively, segments 702 and/or 704 could be printed on top of antenna patterns 706 and/or 708 at some later time. As another example, segments 702 and 704 can be features disposed on the item to be identified or tagged. In either example, if antenna segments 702 and 704 are to have direct electrical coupling to antenna patterns 706 and 708, then the areas of contact (e.g., areas of overlap, or portions thereof) will need to be free of intervening nonconductive layers or provide conductive vias therethrough. In a specific embodiment, tag 700 or components thereof (such as antenna segments 702 and 704) can be integrated within the object or container to be identified.

Crossover angles between segments 702 and 704, on one hand, and antenna patterns 706 and 708, on the other hand, can range from about 10 degrees to about 170 degrees. These crossover angles may differ from each other; however, in a specific embodiment both angles are 90 degrees. Similarly, segments 702 and 704 can be positioned at any point along antenna patterns 706 and 708 (e.g., distal region, proximal region, or midpoint of the associated antenna pattern), but are shown to be evenly spaced about the RFID IC in FIG. 7A. In this example, a vertical offset exists between antenna segments 702 and 704. In another embodiment, segments can be vertically aligned. The selection of these antenna segment parameters: crossover angle, spacing, and alignment can be predetermined for RF performance or economy.

Figure 7B:
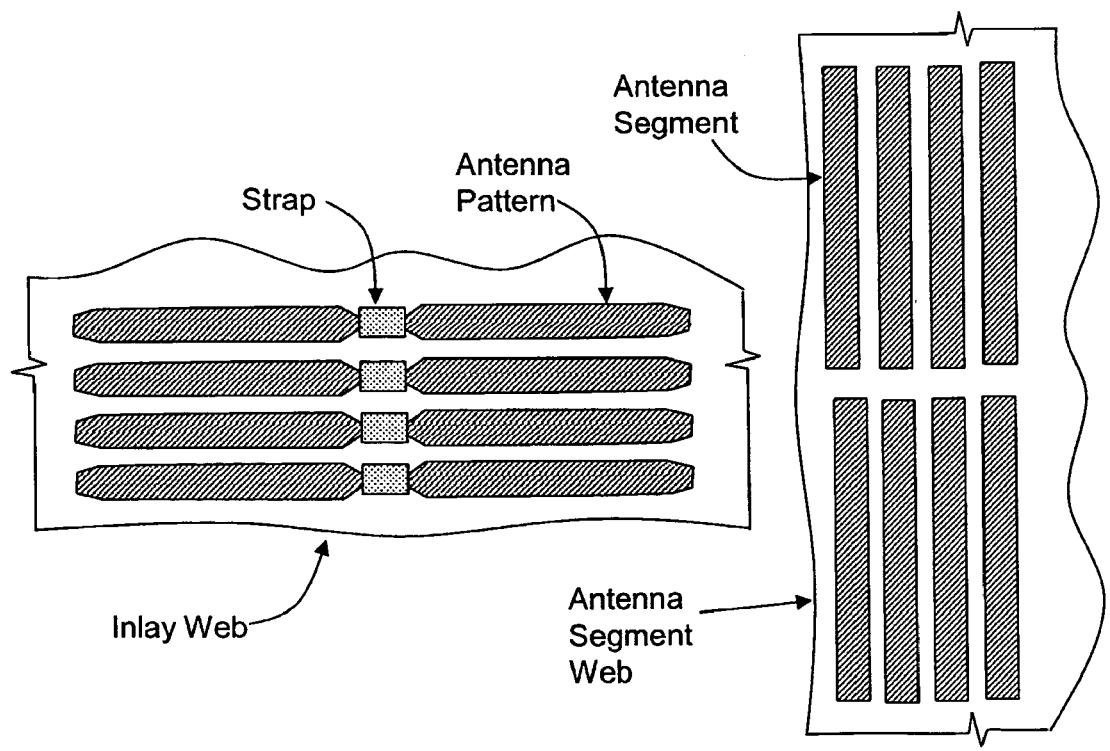
FIG. 7B shows an example of how the RFID inlay of FIG. 7A can be manufactured from two web materials.

FIG. 7B illustrates an example of how the RFID tag of FIG. 7A can be manufactured from two web substrates, which may both be densely packed. Each inlay on the inlay web can be singulated in a manufacturing process. Antenna segments can be singulated from the antenna segment web and then coupled (e.g. mechanically and electrically coupled) to the antenna patterns of an RFID inlay in the manufacturing process. The manufacturing process can be accomplished in an automated fashion. The antenna segment web is shown to have two rows of antenna segments, but in other embodiments, the antenna segment web may have one, three or more rows of antenna segments. After an antenna segment is singulated, the antenna segments can be appropriately positioned to couple to the RFID inlay independently of the number of rows in the antenna segment web.

Figure 8A:
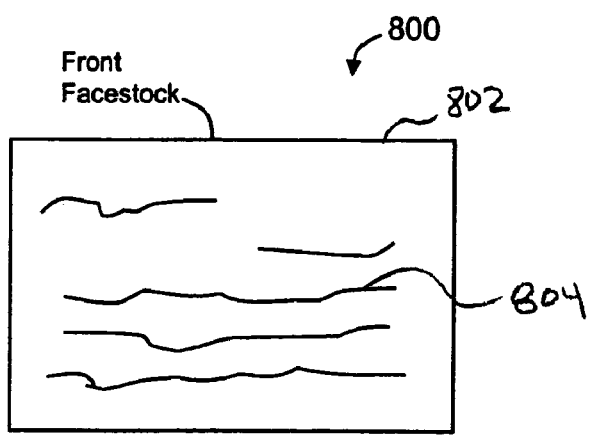
FIGS. 8A-8C illustrate an RFID label according to an embodiment of the present invention.
Figure 8B:
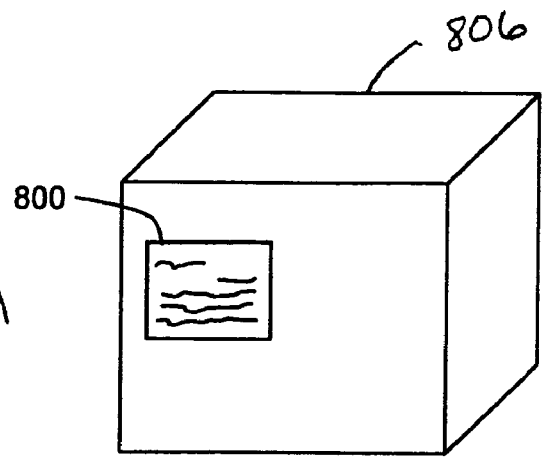
Figure 8C:
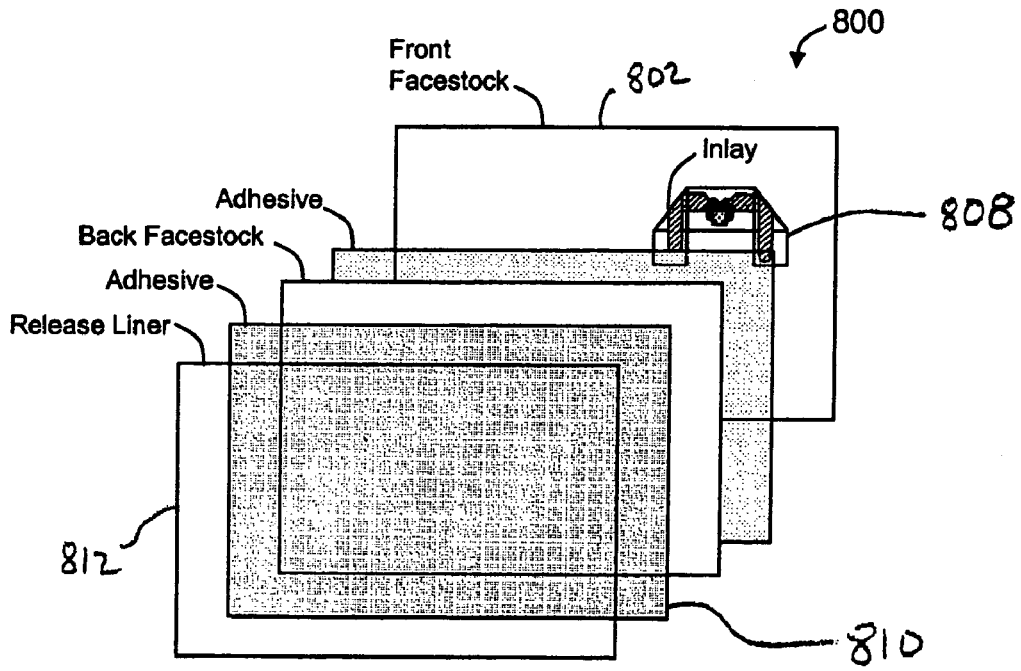

FIGS. 8A-8C illustrate an RFID label 800 according to an embodiment of the present invention. The front view of label 800 in FIG. 8A shows a facestock 802, which can be paper, film, plastic, fabric or foil. Facestock 802 is suitable for printed text 804 or graphics. Generally, as in FIG. 8B, label 800 is affixed to an item 806, which can be a container (e.g., a box, envelope, can, tube, compact disc jewel box, or folder) of an object or, if sensible, the object itself.

FIG. 8C shows an exploded back view of exemplary label 800. Label 800 is multilayered with a front facestock 802, inlay 808, adhesive layer 810, and release layer 812. Inlay 808 includes an antenna pattern having a fold, and may further include a slitted antenna pattern as described above. In a specific embodiment, label 800 can also include a second adhesive layer to hold an optional back facestock. For improved manufacturability, the second adhesive layer can be of the same material used for adhesive layer 810. The back facestock may also include preprinted text or graphics.

It should be recognized that inlay 808 may be about the same size as or smaller than, or much smaller than, label 800. Moreover, the pitch density (cross web and/or down web) of inlays on an inlay web can be higher, or much higher, than the pitch density of finished labels on a label roll. In other words, label 800 can be an off pitch label. Pitch is the center-to-center distance between adjacent objects (for example, distance from center of an inlay to center of an adjacent inlay), and pitch density is the reciprocal of the product of the cross web pitch and down web pitch.

Figure 9:
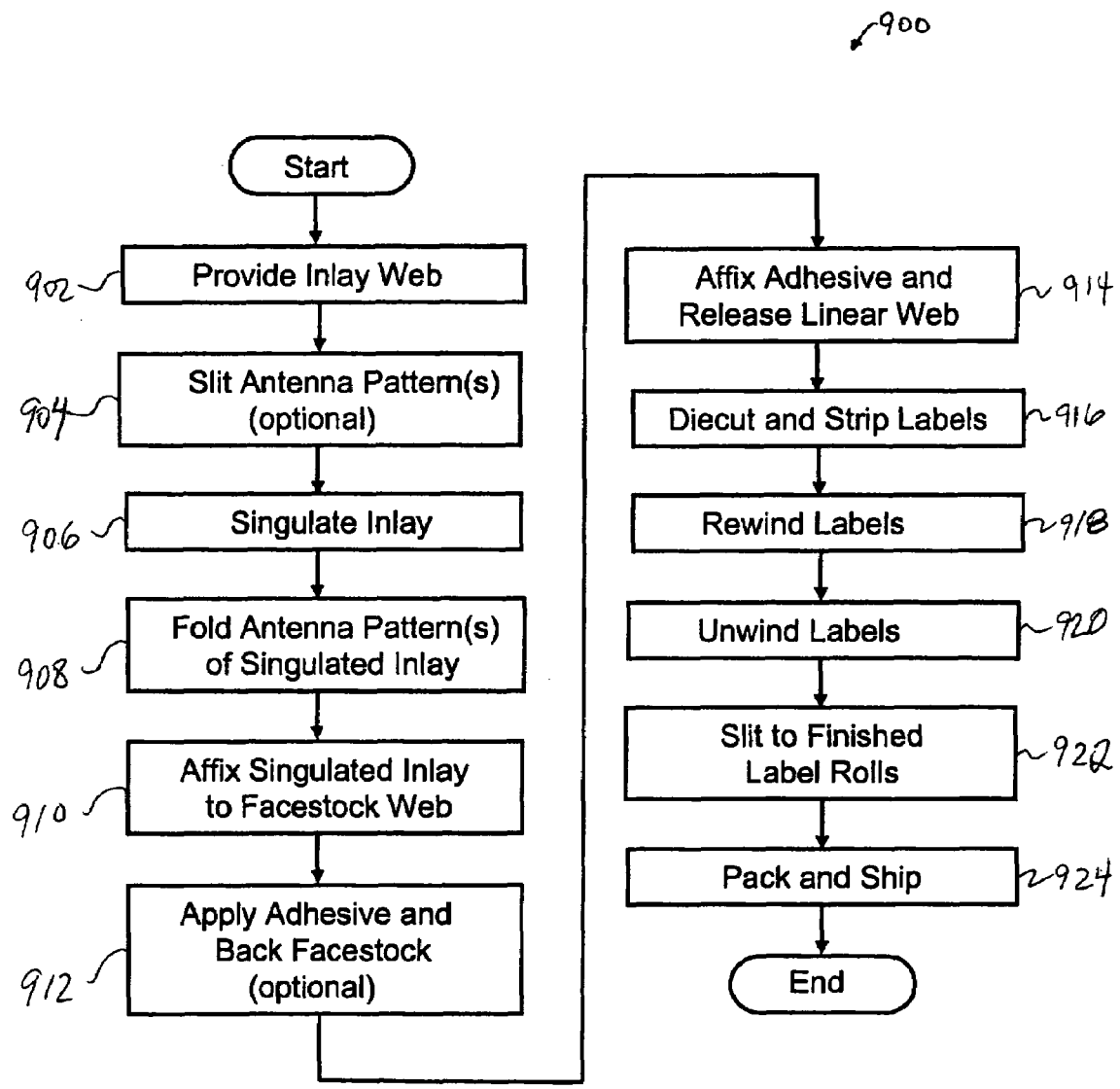
FIG. 9 illustrates a simplified flowchart representation of a method for manufacturing RFID labels according to one embodiment of the present invention.

FIG. 9 illustrates a simplified flowchart representation of a method 900 for manufacturing RFID labels according to one embodiment of the present invention. Method 900 begins with step 902, providing an inlay web. The inlay web can include one or more rows and one or more columns of inlays. In step 904, a cutting wheel slits antenna patterns for each inlay. Inlays are next singulated in step 906 by stamping and resulting antenna flaps are folded in step 908. In step 910, inlays with folded antennas are affixed to a facestock web. An adhesive and back facestock can also be applied in step 912. In step 914, an adhesive and release linear are affixed to the web. The web can next be diecut and rewind to roll in steps 916 and 918. Final processing of the roll can further include steps 920, 922, and 924 for finished smart labels.

The method 900 for manufacturing an RFID label with a folded antenna pattern is an example. Many modifications to method 900 are possible without deviating from the scope of the invention. For example, steps 904 and 912 can be omitted altogether. In fact, any known technique for manufacturing RFID labels can be used, including those described in U.S. Patent Publication No. 2003/013503 assigned to Avery Dennison Corporation, which is hereby incorporated by reference for all purposes.

Figure 10:
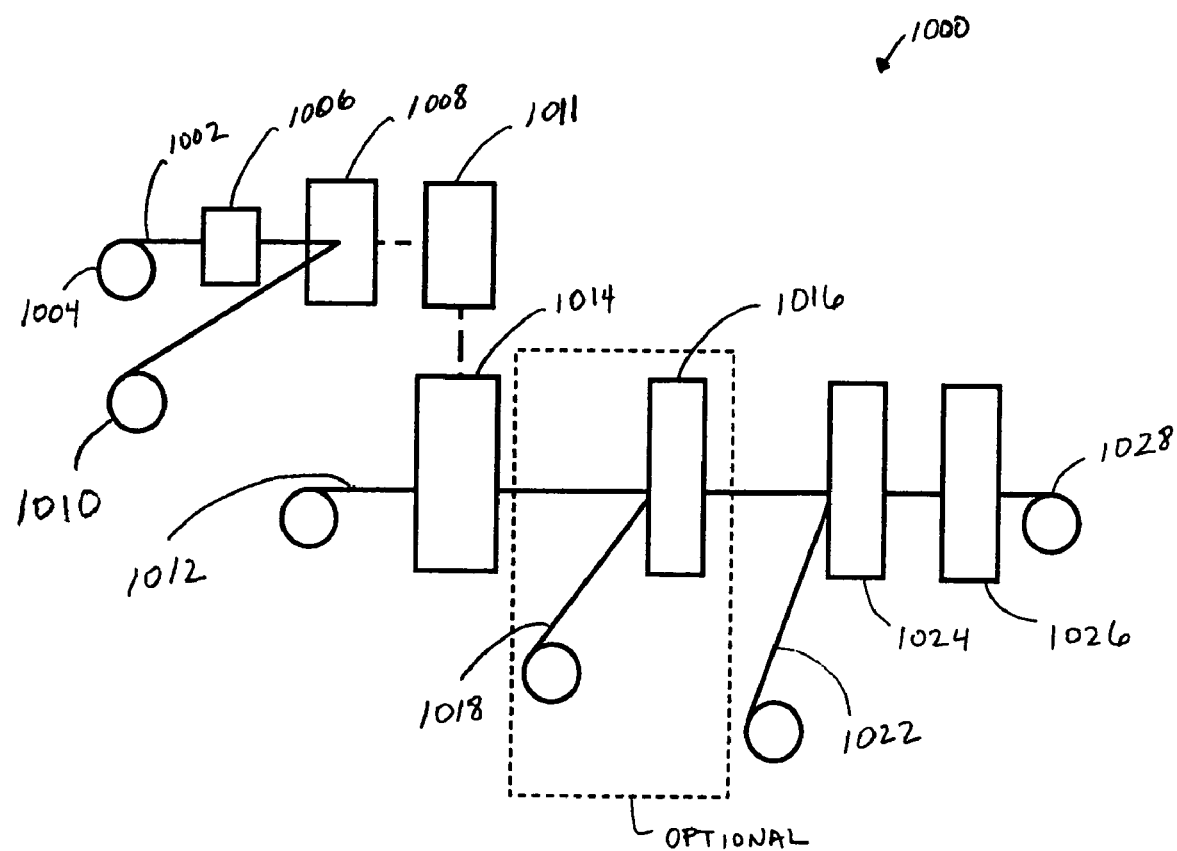
FIG. 10 illustrates a simplified system for manufacturing RFID labels according to an embodiment of the present invention.

FIG. 10 illustrates a simplified system 1000 for manufacturing RFID labels. Inlay web 1002 is unwound from reel station 1004 and fed to stations 1006 and 1008. At station 1006, each inlay of inlay web 1002 can be optionally slit according to an embodiment of the present invention. The slitting operation can be performed by a sharp disk, cutting wheel, knife or other technique. Each inlay is singulated from the inlay web at station 1008 and the matrix waste is rewound by a take-up roll 1010.

Folder 1011 automatically folds one or more antenna patterns for each inlay. The folding process can be implemented to minimize, or avoid all together, fracturing the antenna patterns and breaking the electrical bond between an IC and the antenna patterns. Inlay web 1002 may be previously scored with a sharp knife, creased, or marked with fold marks to assist the folding process.

Each folded inlay is next adhered to a front facestock 1012 at station 1014. Front facestock 1012 can include preprinted text or graphics, or alternatively be printed in-line. Optionally, at station 1016, the resulting web can be laminated to an adhesive and back facestock 1018. An adhesive and release liner 1022 is laminated to the web at station 1024. At station 1026, the web is butt cut and taken up on roll 1028. The strike depth of the butt cutting is controlled down to the release liner, but not through it. In subsequent processes, roll 1028 can be slit into columns and/or cross perforated, and then taken up as a roll or fanfolded.

According to additional embodiments of the present invention, an inlay can further include one or more space members, hereinafter referred to as spacers, between a fold. Spacers can be used to control the geometry of the fold in a z-direction (i.e., a direction orthogonal to the plane of the inlay) and improve RF performance uniformity from inlay-to-inlay (or tag-to-tag) increasing manufacturing yields. The height of the spacers defines a predetermined distance in a z-direction between overlapping portions of the inlay. This predetermined distance can generally range from about 1 millimeter to about 60 millimeters, or better yet about 5 millimeters to about 30 millimeters. In a specific embodiment, the spacers are entirely disposed between the fold. In alternative embodiments, one or more spacers can extend from a first fold of a first antenna pattern to a second fold of a second antenna pattern, or any portion thereof. Any suitable dielectric material can be used as monolayer or multilayer spacers, and spacers may take any arbitrary shape (e.g., a rectangle, square, oval, polygon, or the like). For example, an underlying spacer can be a right triangle with edges coincident with the fold. In an alternative embodiment, the height of a spacer does not exceed the length of the flap, or folded portion of the inlay. In which case, the spacer can function as a mechanical support for a "thick" three-dimensional tag. That is to say, the flap can be consistently maintained in an upright position (in the z-direction) using the spacer as a support.

Figure 11A:
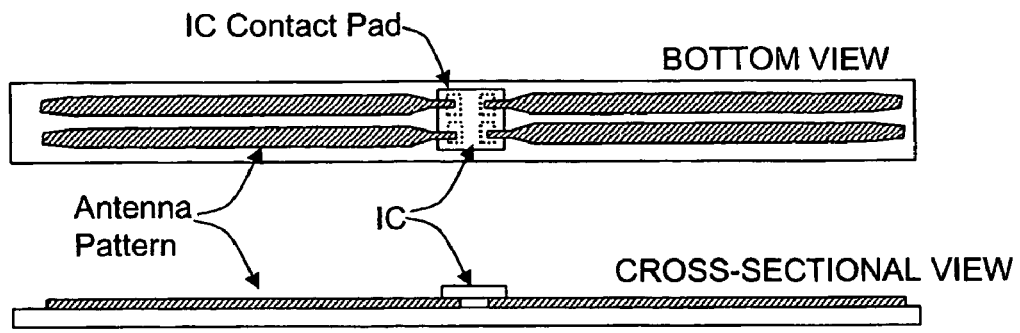
FIG. 11A shows an example of a singulated RFID inlay before folding.
Figure 11B:
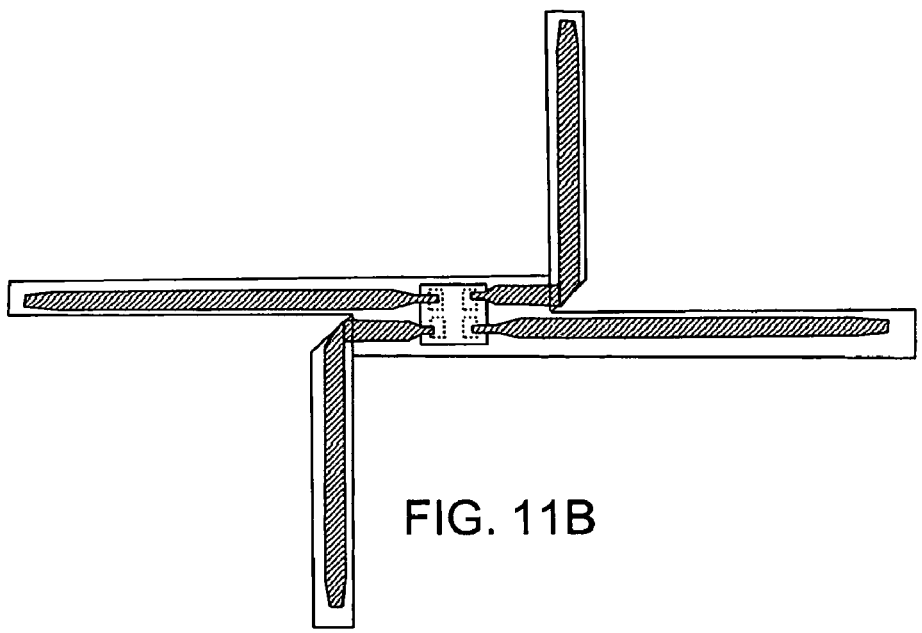
FIGS. 11B-11E show different embodiments of RFID inlays with a plurality of folds in their antenna patterns.
Figure 11C:
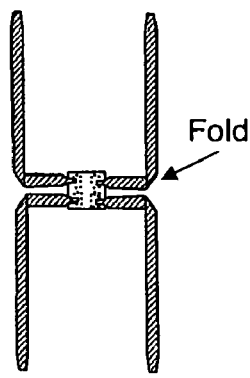
Figure 11D:
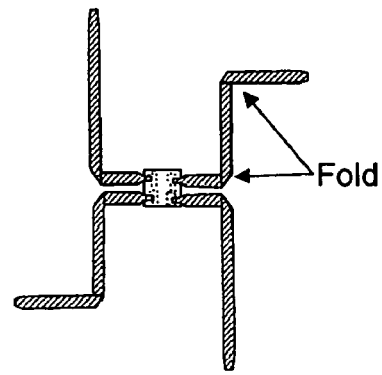
Figure 11E:
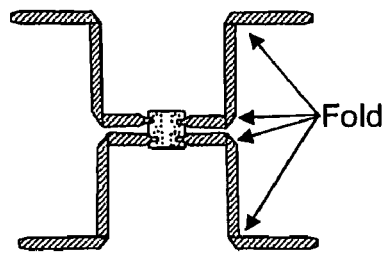

FIGS. 11A-11E illustrate examples where the IC (e.g. RFID IC) includes four contact pads on the IC. In alterative embodiments, the IC may have any number of contact pads, such as one or two or three or more than four contact pads. FIG. 11A shows a singulated inlay in a bottom view and a cross sectional view; the singulated inlay of FIG. 11A is shown before folding. FIGS. 11B-11E show different embodiments of an RFID inlay after folding. The embodiments of FIGS. 11D and 11E include antenna segments with two folds for each antenna segment, and the embodiments of FIGS. 11B and 11C show examples of RFID inlays which have antenna segments with one fold for each antenna segment. In other embodiments, each antenna segment can include any number of folds. It will be appreciated that FIGS. 11B-11E represent only examples and that one, based on the teachings of the specification, can develop many other configurations.

The exemplary embodiments of the present invention are described herein as two dimensional tags, labels, or inlays. However, embodiments may also include three dimensional tags, labels, or inlays. That is to say, a fold in an antenna pattern can set a portion of the antenna pattern, or flap, to be skewed from the original plane of the antenna pattern. In fact, the flap can be orthogonal to the original antenna plane. Although impractical for some RFID applications, a three dimensional tag can be integrated into the item (e.g., two or more adjoining walls of a container) or the flap can be disposed within a recess or crevice of the item.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. An RFID device comprising:
   a flexible substrate;
   an antenna pattern formed on the flexible substrate, the antenna pattern having a major axis from a distal region to a proximal region;
   a fold in the flexible substrate whereby the antenna pattern crosses over itself, the fold disposing the distal region away from the major axis from the proximal region at about a predetermined angle with the major axis; and
   an integrated circuit electrically coupled to the antenna pattern.

2. The RFID device of claim 1 wherein the predetermined angle ranges from about 45 degrees to about 135 degrees.

3. The RFID device of claim 1 wherein the distal region is orthogonal to the major axis from the proximal region.

4. The RFID device of claim 1 wherein a length is defined by a distal end and a proximal end of the antenna pattern, the length ranging from about 1 inch to about 3 inches.

5. The RFID device of claim 4 wherein the RFID device is configured to receive radio frequency signals within about 902 MHz to about 928 MHz, and the length ranges from about 1% to about 100% of a wavelength of the received radio frequency signals.

6. The RFID device of claim 1 wherein the antenna pattern is configured to have improved RF multi-axis performance in a folded arrangement relative to an unfolded arrangement.

7. The RFID device of claim 1 further comprising:
   a second antenna pattern formed on the flexible substrate, the second antenna pattern having a second major axis from a second distal region to a second proximal region; and
   a second fold in the flexible substrate disposing the second distal region away from the second major axis from the second proximal region at about a second predetermined angle.

8. The RFID device of claim 7 wherein the second predetermined angle is about the same as the first predetermined angle.

9. A method for manufacturing an RFID tag, the method comprising:
   providing a web comprising a plurality of RFID inlays, each of the plurality of RFID inlays including:
      an antenna, the antenna having a major axis from a first end to a second end, and
      an integrated circuit electrically coupled to the antenna;
   slitting at the first end along the major axis each antenna to form a partly detached first antenna portion;
   singulating the plurality of RFID inlays;
   folding the first antenna portion of each antenna.

10. The method of claim 9 further comprising slitting at the second end along the major axis each antenna to form a partly detached second antenna portion; and folding the second antenna portion of each antenna.

11. The method of claim 10 further comprising disposing an adhesive layer to the RFID inlay to create an RFID label.

12. An RFID label comprising:
   a facestock layer;
   an adhesive layer; and
   an RFID inlay comprising:
      a flexible substrate;
      an antenna pattern formed on the flexible substrate, the antenna pattern having a major axis from a distal region to a proximal region;
      a fold in the flexible substrate whereby the antenna pattern crosses over itself, the fold disposing the distal region away from the major axis from the proximal region at about a predetermined angle; and
      an integrated circuit electrically coupled to the antenna pattern.

13. The RFID label of claim 12 wherein the integrated circuit includes 3, 4, 5, or 6 contact pads.

14. A system comprising:
   an interrogator to transmit an interrogating RF signal, the interrogator including an antenna and transceiver; and
   a tag storing identifier information, the tag including:
      an antenna formed on a flexible substrate, wherein the antenna comprises a major axis from a proximal region to a distal region of the antenna;
      a fold in the flexible substrate disposing away the distal region of the antenna from the major axis from the proximal region of the antenna at about a predetermined angle with the major axis; and
an integrated circuit electrical y coupled to the antenna.

15. The system of claim 14 wherein the integrated circuit is configured for fluidic self assembly, the integrated circuit being embedded in the flexible substrate.

16. The RFID device of claim 7 wherein the integrated circuit is electrically coupled to the second antenna.

* * * * *

UNITED STATES PATENT AND TRADEMARK OFFICE
CERTIFICATE OF CORRECTION

| | |
|---|---|
| PATENT NO. | : 7,598,867 B2 |
| APPLICATION NO. | : 11/512607 |
| DATED | : October 6, 2009 |
| INVENTOR(S) | : Curtis L. Carrender |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 259 days.

Signed and Sealed this

Twenty-eighth Day of September, 2010

David J. Kappos
*Director of the United States Patent and Trademark Office*